US011055331B1

(12) United States Patent
Neumann et al.

(10) Patent No.: US 11,055,331 B1
(45) Date of Patent: Jul. 6, 2021

(54) ADAPTIVE INTERPRETATION AND COMPILATION OF DATABASE QUERIES (71) Applicant: Tableau Software, Inc., Seattle, WA (US)

(72) Inventors: Thomas Neumann, Munich (DE); Viktor Leis, Munich (DE); Alfons Kemper, Munich (DE); Tobias Muehlbauer, Munich (DE); Jan Finis, Munich (DE)

(73) Assignee: TABLEAU SOFTWARE, INC., Seattle, WA (US)

(*) Notice: Subject to any disclaimer, the term of this patent is extended or adjusted under 35 U.S.C. 154(b) by 972 days.

(21) Appl. No.: 15/700,023

(22) Filed: Sep. 8, 2017

Related U.S. Application Data

(60) Provisional application No. 62/532,959, filed on Jul. 14, 2017, provisional application No. 62/418,246, filed on Nov. 6, 2016.

(51) Int. Cl.
*G06F 16/00* (2019.01)
*G06F 16/33* (2019.01)
*G06F 16/23* (2019.01)

(52) U.S. Cl.
CPC .......... *G06F 16/3332* (2019.01); *G06F 16/23* (2019.01); *G06F 16/334* (2019.01)

(58) Field of Classification Search
CPC ..... G06F 16/3332; G06F 16/23; G06F 16/334
USPC ........................................................ 707/718
See application file for complete search history.

(56) References Cited

U.S. PATENT DOCUMENTS

| 5,948,038 | A | 9/1999 | Daly |
| 6,195,449 | B1 | 2/2001 | Bogden |
| 7,519,990 | B1 | 4/2009 | Xie |
| 7,634,459 | B1* | 12/2009 | Eshet ................ G06F 16/217 |
| 8,782,619 | B2* | 7/2014 | Wu ..................... G06F 8/434 |
| | | | 717/137 |
| 9,195,712 | B2* | 11/2015 | Freedman ....... G06F 16/24542 |

(Continued)

OTHER PUBLICATIONS

Neumann, Office Action, U.S. Appl. No. 15/719,479, dated Feb. 20, 2018, 8 pgs.

(Continued)

*Primary Examiner* — Debbie M Le
(74) *Attorney, Agent, or Firm* — Morgan, Lewis & Bockius LLP (57) ABSTRACT

A method executes at a computer system to retrieve data from a database. Upon receiving a database query, the computer system translates the query into an intermediate representation, and estimates a compilation time to compile the intermediate representation into machine executable code. The query execution time to retrieve a result set is also estimated. In accordance with a determination that the query execution time and compilation time satisfy an interpretation criterion, the computer system invokes a byte code interpreter to interpret the intermediate representation and retrieve the result set from the database. In accordance with a determination that the query execution and compilation times satisfy one of a plurality of compilation criteria, the computer system compiles the intermediate representation to form machine code and executes the machine code to retrieve the result set from the database. In some cases, the query intermediate representation is optimized prior to compilation.

20 Claims, 8 Drawing Sheets

(56) References Cited

U.S. PATENT DOCUMENTS

| | | |
|---|---|---|
| 9,202,297 B1 | 12/2015 | Winters |
| 9,413,807 B1 | 8/2016 | Sherman |
| 9,633,076 B1 | 4/2017 | Morton |
| 10,089,281 B1 | 10/2018 | Neumann et al. |
| 10,089,282 B1 | 10/2018 | Neumann et al. |
| 10,325,010 B1 | 6/2019 | Neumann et al. |
| 10,353,922 B1 | 7/2019 | Stolte |
| 10,540,425 B2 | 1/2020 | Neumann et al. |
| 2003/0158842 A1* | 8/2003 | Levy .......... G06F 16/24532 |
| 2005/0011391 A1 | 1/2005 | Jennings |
| 2005/0026118 A1 | 2/2005 | Chen |
| 2005/0027547 A1 | 2/2005 | Chen |
| 2008/0209354 A1 | 8/2008 | Stanek |
| 2009/0106778 A1 | 4/2009 | Pomeroy |
| 2011/0055585 A1 | 3/2011 | Lee |
| 2011/0316884 A1 | 12/2011 | Giambalvo et al. |
| 2015/0362325 A1 | 12/2015 | Shin |

OTHER PUBLICATIONS

Neumann, Notice of Allowance, U.S. Appl. No. 15/719,479, dated Jul. 24, 2018, 10 pgs.

Neumann, Pre-Interview First Office Action, U.S. Appl. No. 15/885,646, dated May 30, 2018, 5 pgs.

Neumann, Notice of Allowance, U.S. Appl. No. 15/885,646 dated Jul. 18, 2018, 10 pgs.

Neumann, Office Action, U.S. Appl. No. 16/134,919, dated Jan. 24, 2019, 12 pgs.

Neumann, Notice of Allowance, U.S. Appl. No. 16/445,139, dated Sep. 17, 2019, 9 pgs.

Neumann, Office Action, U.S. Appl. No. 16/726,737, dated Feb. 18, 2020, 9 pgs.

Neumann, Notice of Allowance, U.S. Appl. No. 16/726,737, dated May 29, 2020, 9 pgs.

The Information Lab, Tips for using the Tableau Tooltip Tool, Aug. 20, 2015, YouTube, https://www.youtube.com/watch?v=D3WaD7gNVZk, 1 pg.

* cited by examiner

ADAPTIVE INTERPRETATION AND COMPILATION OF DATABASE QUERIES

RELATED APPLICATIONS

This application claims priority to U.S. Provisional Application Ser. No. 62/532,959, filed on Jul. 14, 2017, entitled "Generating Adaptively Optimized Code for Database Queries," which is incorporated by reference herein in its entirety. This application also claims priority to U.S. Provisional Application Ser. No. 62/418,246, filed on Nov. 6, 2016, entitled "High Performance Relational Database System," which is incorporated by reference herein in its entirety.

TECHNICAL FIELD

The disclosed implementations relate generally to database systems, and more specifically to system features that improve query execution performance.

BACKGROUND

Data is commonly stored in a relational database and accessed by queries using a prescribed syntax (e.g., SQL). SQL database query engines are normally designed as interpreters that evaluate relational algebra operations in a database query one by one. Such interpreters commonly have extended execution times in modern database systems, particularly for queries that access lots of data. As an alternative, some database systems compile a database query into machine code and execute the machine code to retrieve a result set from the database. Although this is commonly efficient for queries that access a lot of data, the time required to compile the query to machine code can dominate the overall query processing time when a query accesses or returns only a small amount of data. For example, it may take 50 milliseconds to compile a complex structured query to executable machine code, whereas executing the compiled machine code may take only one or two milliseconds when the accessed data is small.

SUMMARY

Accordingly, implementations of the present invention are directed to database querying that includes adaptive selection of a query execution plan based on one or more query characteristics and database characteristics. Specifically, a computer system identifies one or more of the query characteristics (e.g., the number of instructions associated with a database query) and database characteristics (e.g., the number of data rows that will be accessed). The database engine estimates the query compilation time and the query execution time based on these characteristics. The database engine then selects the query execution plan from a plurality of querying options (e.g., (1) direct query interpretation, (2) query compilation and execution, or (3) query optimization, compilation, and execution) according to the estimated query compilation and execution times. The selected query execution plan takes into consideration the query characteristics of the specific database query, the database characteristics of the specific database, or both, thereby enabling a more adaptive and efficient database querying process that is adjusted to achieve an optimal overall time to return query results.

In accordance with some implementations, a method for retrieving data from a database is performed at a computer system having one or more processors and memory storing one or more programs configured for execution by the one or more processors. The method includes receiving a database query from a client and translating the database query into an intermediate representation. In some implementations, the database query is written in SQL. In some implementations, the intermediate representation is specified in low level virtual machine (LLVM) code. In some implementations, translating the database query into an intermediate expression includes parsing the database query to form an operator tree, logically optimizing the operator tree, and compiling the (logically optimized) operator tree to form the intermediate representation. The database engine computes an estimated query execution time according to an estimated number of rows that will be accessed to retrieve a result set corresponding to the database query. The database engine also computes an estimated compilation time to compile the intermediate representation into machine executable code according to a size of the intermediate representation. When the estimated query execution time and the estimated compilation time satisfy an interpretation criterion, the database engine invokes a byte code interpreter to retrieve the result set from the database by interpreting the intermediate representation. When the estimated query execution time and the estimated compilation time satisfy a compilation criterion, the database engine compiles the intermediate representation to form executable machine code and executes the executable machine code to retrieve the result set from the database. When the estimated query execution time and the estimated compilation time satisfy an optimized compilation criterion, the database engine performs one or more optimization passes on the intermediate representation to form an optimized intermediate representation, compiles the optimized intermediate representation to form optimized executable machine code, and executes the optimized executable machine code to retrieve the result set from the database. The database engine then returns the result set to the client.

In some implementations, computing the estimated compilation time is based on one or more factors, including the number of instructions, the types of instructions, the number of functions, and the number of execution blocks in the intermediate representation. Each block of the intermediate representation includes a maximal contiguous sequence of instructions without a jump instruction.

In some implementations, the interpretation criterion, the compilation criterion, and the optimized compilation criterion are determined using one or more test databases and/or a plurality of test database queries prior to receiving the database query.

In some implementations, the interpretation criterion is satisfied when the estimated number of rows that will be accessed to retrieve the result set is less than or equal to a first threshold. In some implementations, the compilation criterion is satisfied when the estimated number of rows that will be accessed to retrieve the result set is greater than the first threshold but less than or equal to a second threshold. In some implementations, the optimized compilation criterion is satisfied when the estimated number of rows that will be accessed to retrieve the result set is greater than the second threshold. In some implementations, the interpretation criterion, the compilation criterion, and the optimized compilation criterion are mutually exclusive. In some implementations, when the interpretation criterion is satisfied, the compilation criterion and the optimized compilation criterion are not evaluated.

In some implementations, the method for retrieving data from the database further includes computing a ratio of the estimated execution time to the estimated query compilation time. The interpretation criterion includes a rule that is satisfied when the ratio is less than or equal to a first threshold. The compilation criterion includes a rule that is satisfied when the ratio is greater than a first threshold but less than or equal to a second threshold. The optimized compilation criterion includes a rule that is satisfied when the ratio is greater than the second threshold.

In some implementations, the interpretation criterion, the compilation criterion, and the optimized compilation criterion partition the set of all pairs (e, c) of estimated query execution time and estimated compilation time into three disjoint regions (e.g., partitioning the first quadrant of a two-dimensional set of coordinate axes).

In some implementations, a computer system includes one or more processors, and memory storing one or more programs that are configured for execution by the one or more processors. The one or more programs include instructions for performing any of the methods described herein.

In some implementations, a non-transitory computer readable storage medium stores one or more programs configured for execution by a computer system having one or more processors, volatile memory, and non-volatile memory. The one or more programs include instructions for performing any of the methods described herein.

Thus, methods and systems are disclosed for executing database queries according to one or more query characteristics and one or more database characteristics. The process estimates query execution time and compilation time based on these query and database characteristics, and adaptively selects a query execution plan in accordance with a determination whether the estimated query execution time and the compilation time satisfy one of an interpretation criterion, a compilation criterion, and an optimized compilation criterion. This process enables a more efficient database querying process as it is adaptively adjusted according to query and database characteristics.

It is to be understood that both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
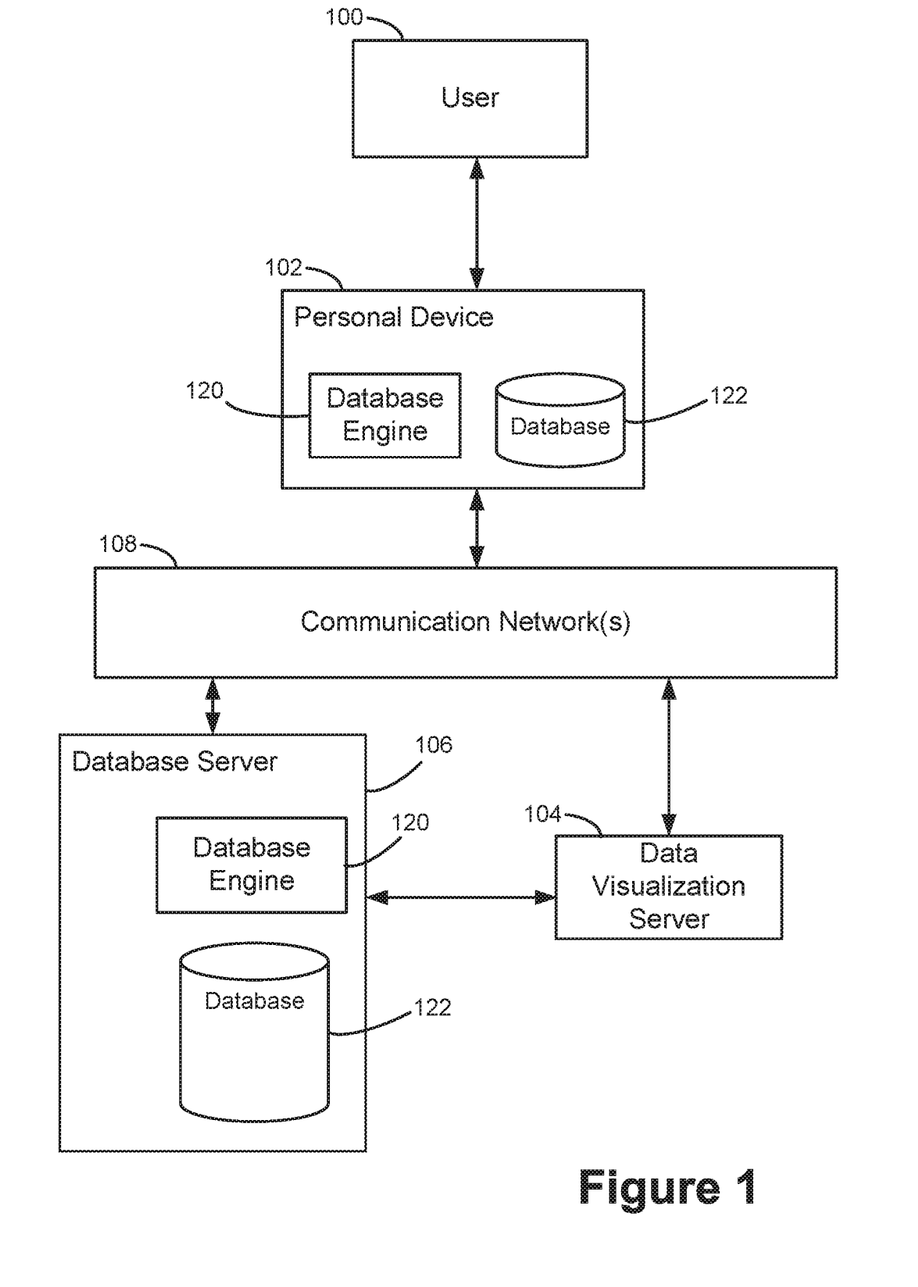
FIG. 1 illustrates a database system that retrieves data from a database in response to a database query in accordance with some implementations.

FIG. 1 illustrates using a database system to retrieve data from a database 122 in response to a database query in accordance with some implementations. A user 100 interacts with a personal device 102, such as a desktop computer, a laptop computer, a tablet computer, a mobile smartphone, or a mobile computer system. A personal device 102 is an example of a computer system 200. The term "computer system" also includes server computers, which may be significantly more powerful than a personal device used by a single user, and are generally accessed by a user indirectly via a personal device. An example computer system 200 is described below with respect to FIG. 2, including various software programs or modules that execute on the device 200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). Data stored in the relational databases 122 of the personal device 102 is retrieved in accordance with database queries received by the database engine 120. In some implementations, the personal device 102 includes a data visualization application 222, which the user 100 uses to create data visualizations from the desktop data sources 224 and/or the relational databases 122. For example, the data visualization application 222 of the personal device 102 generates a database query for a data visualization, and sends the database query to the database engine 120. The database engine 120 then retrieves data stored in the database 122 of the personal device 102 in response to the database query. Upon receiving the retrieved data from the database engine 120, the data visualization application 222 visualizes the retrieved data locally, thereby enabling the user 100 to visualize the data that is stored locally on the personal device 102.

In some implementations, the personal device 102 connects to one or more external database servers 106 and/or a data visualization server 104. Each of the one or more database servers 106 includes a database engine 120 configured to access one or more databases 122 that are stored at the respective database server 106. In some implementations, the data visualization server 104 includes a database engine 120 and one or more databases 122, and the database engine 120 is configured to access one or more databases 122 of the data visualization server 104.

In some implementations, data visualization functionality is implemented only by the data visualization application 222 of the personal device 102 locally. In some implementations, the data visualization functionality is provided collectively by the local data visualization application 222 and the remote data visualization server 104, particularly when corresponding data retrieval or visualization involves resource intensive operations that are preferably implemented at a specialized server. In this situation, the user 100 may build a data visualization using the local application 222 of the personal device 102. In some implementations, one or more requests are sent to the data visualization server 104 to generate data visualizations.

In some implementations, the personal device 102 connects to the external database servers 106 and/or the data visualization server 104 over one or more communications networks 108. The communication networks 108 can include one or more network topologies, including the Internet, intranets, local area networks (LANs), cellular networks, Ethernet, Storage Area Networks (SANs), telephone networks, Bluetooth personal area networks (PAN), and the like. In some implementations, the data visualization server 104 provides a data visualization web application that runs within a web browser 220 on the personal device 102.

In accordance with some implementations, upon receiving a database query, the database engine 120 translates the database query into an intermediate representation, which can be executed in several ways. In accordance with a first query execution option, the database engine 120 invokes a byte code interpreter to interpret the intermediate representation of the database query and retrieve a result set from a database 122 corresponding to the database query. In accordance with a second query execution option, the database engine 120 compiles the intermediate representation to form executable machine code, and executes the executable machine code to retrieve the result set from the database 122. In accordance with a third query execution option, the database engine 120 performs one or more optimization passes on the intermediate representation to form an optimized intermediate representation, compiles the optimized intermediate representation to form optimized executable machine code, and executes the optimized executable machine code to retrieve the result set from the database 122.

Generally, the database engine 120 can extract the result set from the database 122 more quickly using the compiled intermediate representation than using the byte code interpreter. Using optimized executable machine code is generally even faster. However, compilation and optimization take time. The second or third query execution options are therefore justified when the overhead from compilation or optimization of the intermediate representation is small compared to the time that can be saved from execution of the compiled or optimized intermediate representation. For example, when a database 122 has a large number of rows of data, the byte code interpreter would be slow, so the database query may be compiled or optimized to shorten the overall execution time.

Each database query has an estimated query compilation time (i.e., the length of time that the database engine 120 needs to compile the intermediate representation of the database query), and/or an estimated query execution time (i.e., the length of time that the database engine 120 needs to execute the intermediate representation of the database query). The estimated query compilation time and the estimated query execution time are determined by the complexity of the database query and the number of rows of data that will be accessed by the query. Selection of a query execution plan from the plurality of query execution operation is therefore determined based on one or more query characteristics and one or more database characteristics. The query execution plan is selected to minimize the overall time (e.g., the selected query execution plan minimizes the sum of the estimated query compilation time and the estimated query execution time). In some implementations, the estimated query execution time is based on the estimated time for processing the intermediate representation using a byte code interpreter. In some implementations, the estimated query execution time is based on the time expected to run compiled machine code. In some implementations, the estimated query execution time includes two or more estimates (e.g., an estimate of execution time for each of the three execution options).

Figure 2:
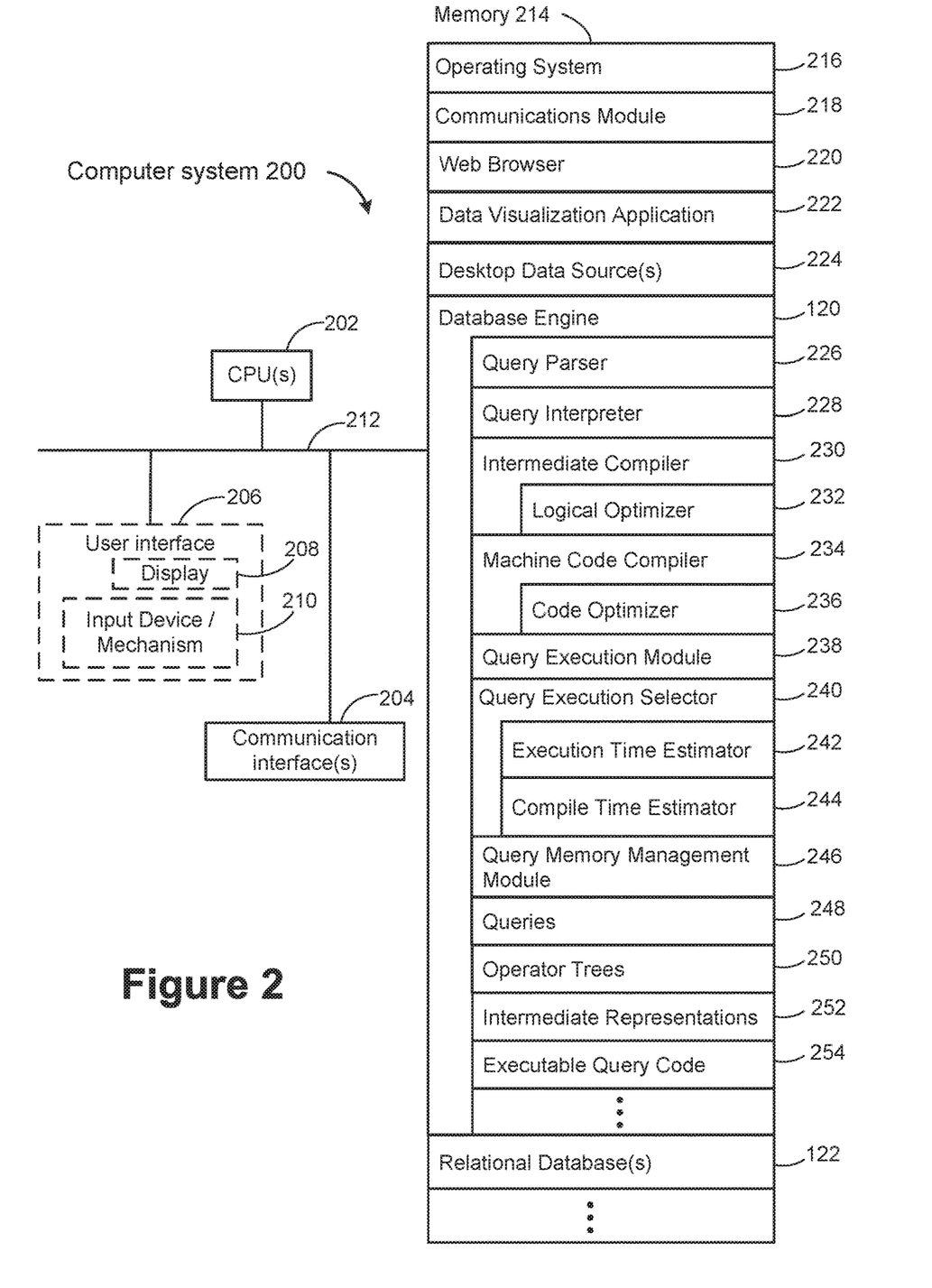
FIG. 2 is a block diagram of a computer system in accordance with some implementations.

FIG. 2 is a block diagram illustrating a computer system 200 in accordance with some implementations. As used herein, the term "computer system" includes personal devices 102, servers (such as a database server 106 or a data visualization server 104) or both. A computer system 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computer system 200 may include a user interface 206 including a display device 208 and one or more input devices/mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 include a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a computer readable storage medium.

In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computer system 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a personal device 102, a data visualization server 104, or a database server 106). The data visualization application then generates and displays the retrieved information in one or more data visualizations;

zero or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);

a database engine 120, which receives database queries (e.g., from a data visualization application) and retrieves corresponding data from the relational database 122 in response to the database queries; and one or more relational databases 122, which store collections of related data organized according to a predetermined data structure and can be accessed by the database engine 120 using database queries. In some implementations, the relational databases 122 include collections of tables, views, stored procedures, and other database objects.

The database engine 120 includes a plurality of executable modules. In some implementations, the memory 214, or the computer readable storage medium of the memory 214, stores the following executable modules of the database engine 120, or a subset thereof:

a query parser 226, which parses received queries 248 (e.g., SQL database queries) to create operator trees 250, which are sometimes referred to as expression trees or algebra trees. In some implementations, the query parser 226 is integrated with the query interpreter 228 or the intermediate compiler 230;

a query interpreter 228 (also called a byte code interpreter), which interprets the intermediate representation directly to retrieve result sets from the databases 122;

an intermediate compiler 230, which compiles each operator tree 250 to form an intermediate representation (IR) 252. Typically, the intermediate compiler 230 uses a logical optimizer 232 to optimize the operator tree 250. In general, the logical optimization occurs before compiling to the intermediate representation, but some intermediate compilers perform both logical optimization and compilation to the intermediate representation 252 at the same time (e.g., interspersed).

a machine code compiler 234, which translates an intermediate representation into executable machine code 254. In some implementations, the machine code compiler 234 selects between in-memory operators and spooling operators depending on available memory;

a code optimizer 236, which performs one or more optimization passes on the intermediate representation to form an optimized intermediate representation. The optimized intermediate representation is then translated into optimized executable machine code 254 by the machine code compiler 234. In some implementations, the code optimizer 236 selects between in-memory operators and spooling operators depending on available memory;

a query execution module 238, which executes the executable machine code 254 generated by the machine code compiler 234. In some implementations, the query execution module 238 includes an abort module, which can abort the execution of the code (e.g., upon detecting an out of memory condition). In some implementations, the abort module communicates with the machine code compiler 234 or the code optimizer 236 to recompile the intermediate representation after execution is aborted. In some implementations, the query execution module 238 includes a result reuse module, which stores and reuses intermediate results that were created during a previous execution that was aborted;

a query execution selector 240, which selects how to execute the queries. The options include using the query interpretation module 228, the machine code compiler 234, or the code optimizer 236 together with the machine code compiler 234. In some implementations, the query execution selector 240 includes an execution time estimator 242, which estimates a query execution time according to one or more database characteristics (e.g., an estimated number of rows that will be accessed to retrieve a result set corresponding to the database query). In some implementations, the query execution selector 240 includes a compilation time estimator 244, which estimates the time to compile the intermediate representation into machine executable code 254 according to one or more query characteristics (e.g., the size of the intermediate representation 252); and a query memory management module 246, which detects when there is insufficient memory while executing the compiled executable machine code. In some implementations, the query memory management module 246 communicates with the query execution module 238 and/or the abort module to abort execution of the compiled code (optimized or not optimized).

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computer system 200, FIG. 2 is intended more as a functional description of the various features that may be present rather than as a structural schematic of the implementations described herein. In practice, and as recognized by those of ordinary skill in the art, modules shown separately could be combined and some modules could be separated.

Figure 3:
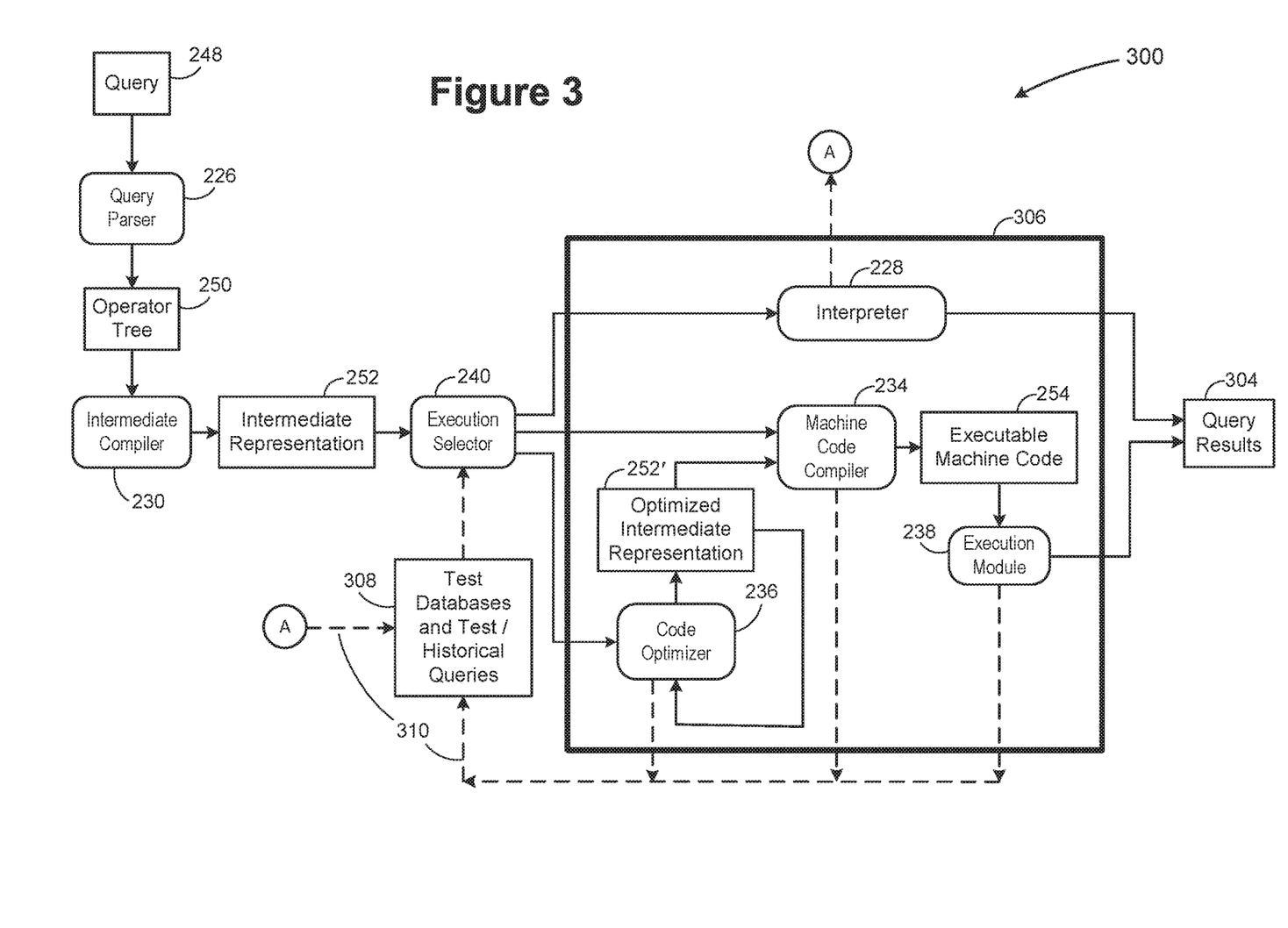
FIG. 3 is a block diagram of a query execution system implemented by a computer system in accordance with some implementations.

FIG. 3 is a block diagram of a query execution system 300 implemented by a database engine 120 of a computer system 200 in accordance with some implementations. The query execution system 300 includes a query parser 226, which receives database queries 248 (e.g., SQL queries). The parser 226 parses each database query 248 to form an operator tree 250. The intermediate compiler 230 compiles the operator tree to form an intermediate representation 252. This typically includes some logical optimization as well. In some implementations, the intermediate representation is expressed in low level virtual machine (LLVM) code.

An execution selector 240 is coupled to the intermediate compiler 230. The execution selector 240 identifies one or more query characteristics and one or more database characteristics to determine how to execute the query. In some implementations, the execution selector 240 uses the interpretation criterion, the compilation criterion, and the optimized compilation criterion to make the selection. In some implementations, the execution selector 240 estimates the query execution time according to the one or more database characteristics (e.g., an estimated number of rows that will be accessed to retrieve a result set 304 corresponding to the database query 248). In some implementations, the execution selector 240 also estimates the time that is needed to compile the intermediate representation into machine executable code 254 according to one or more query characteristics (e.g., the size of the intermediate representation 252). The estimated query execution time and the estimated query compilation time are analyzed to determine whether they satisfy one or more of the interpretation criterion, the compilation criterion, and the optimized compilation criterion. In some implementations, each of the query execution time and the query compilation time is estimated based on both the query characteristics and the database characteristics.

The execution selector 240 selects one of a plurality of execution options 306 to process the intermediate representation 252. In some implementations, the plurality of execution options 306 includes direct interpretation without compilation, compilation with no or little code optimization (e.g., "cheap" optimizations), and compilation with a more significant level of code optimization. The plurality of execution options 306 have trade-offs between the query compilation time and the query execution time. For example, when an execution option 306 spends a long time on code optimization, it results in faster execution (i.e., a smaller query execution time).

In some implementations, the execution selector 240 implements a heuristic process to select an execution plan from the plurality of execution options 306, and the heuristic process minimizes the sum of the query compilation time and the query execution time. In some implementation, the query compilation time is estimated based on the size of the intermediate representation 252 (e.g., the size of the LLVM code, the number of instructions in the LLVM code, or the number of functions of the LLVM code). In some implementations, the query execution time is estimated based on the number of tuples (e.g., rows in the database 122) that will be accessed or touched for retrieving the result set 304 corresponding to the database query 248.

In some implementations, the query compilation time and the query execution time are estimated conservatively according to their worst case, and optionally adjusted to compensate for overestimation before the estimated query compilation and execution times are used to select the execution plan from among the plurality of execution options. In some implementations, when joins are involved in the database query 248, the query execution time is overestimated because of an assumption of the worst case (e.g., a Cartesian product). The query execution time is adjusted by using the sum of the cardinalities of two data sets that are joined rather than a product of the cardinalities.

In some implementations, the database query 248 is segmented into a plurality of subqueries, each of which is translated into an execution block. In some implementations, the segments are based on execution pipelines. The execution selector 240 then handles each execution block corresponding to one of the plurality of subqueries individually. That is, the execution selector 240 receives each execution block from the intermediate compiler 230, and identifies one or more query characteristics for the respective execution block. The execution selector 240 estimates a query execution time and a query compilation time for the respective execution block. Then, the estimated query execution time and the estimated query compilation time are analyzed to determine whether they satisfy one or more of the interpretation criterion, the compilation criterion, and the optimized compilation criterion. The execution selector 240 then selects one of a plurality of execution options 306 to process the respective execution block corresponding to one of the plurality of subqueries. In some implementations, even when the database query 248 is not segmented, the intermediate representation is broken into a plurality of execution blocks. The execution selector 240 then handles each execution block individually as described above.

In some implementations, the execution selector 240 determines that the estimated query execution time and the estimated compilation time satisfy an interpretation criterion, and invokes the interpreter 228 to interpret the intermediate representation and retrieve the result set 304 from the database 122. In some implementations, the interpretation criterion is satisfied when the ratio between the estimated query execution time and estimated compilation time is less than or equal to a first predefined threshold ratio. In some implementations, the interpretation criterion is satisfied when the estimated execution time is less than or equal to a first execution time threshold, independent of the estimated compilation time.

In some implementations, the execution selector 240 determines that the estimated query execution time and the estimated compilation time satisfy a compilation criterion, and invokes the machine code compiler 234 to compile the intermediate representation 252 to form executable machine code 254. The execution module 238 executes the executable machine code 254 to retrieve the result set 304 from the database 122. In some implementations, the compilation criterion is satisfied when the ratio between the estimated query execution and compilation times is greater than the first predefined threshold ratio, but less than a second predefined threshold ratio. In some implementations, the compilation criterion is satisfied when the estimated execution time is greater than the first execution time threshold and less than a second execution time threshold, independent of the estimated compilation time. In some implementations, the compilation criterion is satisfied when the estimated execution time is greater than the first execution time threshold and the estimated compilation time is greater than or equal to a compilation time threshold.

In some implementations, the execution selector 240 determines that the estimated query execution time and the estimated compilation time satisfy an optimized compilation criterion. In this case, the execution selector 240 invokes the code optimizer 236 to perform one or more optimization passes on the intermediate representation 252 to form an optimized intermediate representation 252', and invokes the machine code compiler 234 to form optimized executable machine code 254. The optimized executable machine code 254 is then executed to retrieve the result set 304 from the database 122. In some implementations, the optimized compilation criterion is satisfied when the ratio between the estimated query execution time and compilation time is greater than or equal to the second predefined threshold ratio. In some implementations, the optimized compilation criterion is satisfied when the estimated execution time is greater than or equal to the second execution time threshold, independent of the estimated compilation time. In some implementations, the optimized compilation criterion is satisfied when the estimated execution time is greater than the first execution time threshold and the estimated compilation time is less than the compilation time threshold.

The interpretation criterion, the compilation criterion, and the optimized compilation criterion include a plurality of predefined thresholds (e.g., the first and second predefined threshold ratios, the first and second execution time thresholds, and the compilation time threshold). In some implementations, one or more test queries are issued to retrieve data from the database 122 for determining (308) the plurality of predefined thresholds (e.g., the compilation time threshold). In some implementations, one or more test queries are issued to retrieve data from one or more test databases distinct from the database 122 for determining (308) the plurality of predefined thresholds (e.g., the first and second predefined threshold ratios, the first and second execution time thresholds).

In some implementations, the estimated query execution time, the estimated query compilation time, and/or the estimated optimization time are monitored (310) when the intermediate representation is being processed with one of the plurality of query execution options 306. The monitored query execution and compilation times are returned (310) to the execution selector 240 to adjust estimation parameters or thresholds. In this way, the estimated query execution and compilation times can better reflect actual query execution and compilation times. In some implementations, the monitored query execution and compilation times are compared with the estimated query execution and compilation times for adjusting the plurality of predefined thresholds (e.g., the predefined threshold ratios, execution time thresholds, and compilation time threshold). The feedback (310) can occur in real-time, or later (e.g., as a batch process during off-peak processing).

In some implementations, the execution selector uses a similarity metric to compare new queries to previously executed queries 308 when determining an execution option. In some implementations, the similarity metric uses time estimate data. In some implementations, the similarity metric compares characteristics of the tables accessed, such as identicality of the tables, table sizes, or the existence of indexes. In some implementations, the similarity metric compares query structure and/or complexity.

In some implementations, the interpretation criterion, the compilation criterion, and the optimized compilation criterion are dynamically determined based on available computational and/or storage resources (e.g., memory or CPU bandwidth). Specifically, the plurality of predefined thresholds (e.g., the first and second predefined threshold ratios, the first and second execution time thresholds and the compilation time threshold) are dynamically adjusted according the computational and/or storage resources that are available at a specific instant at the relevant computing device.

Figure 4:
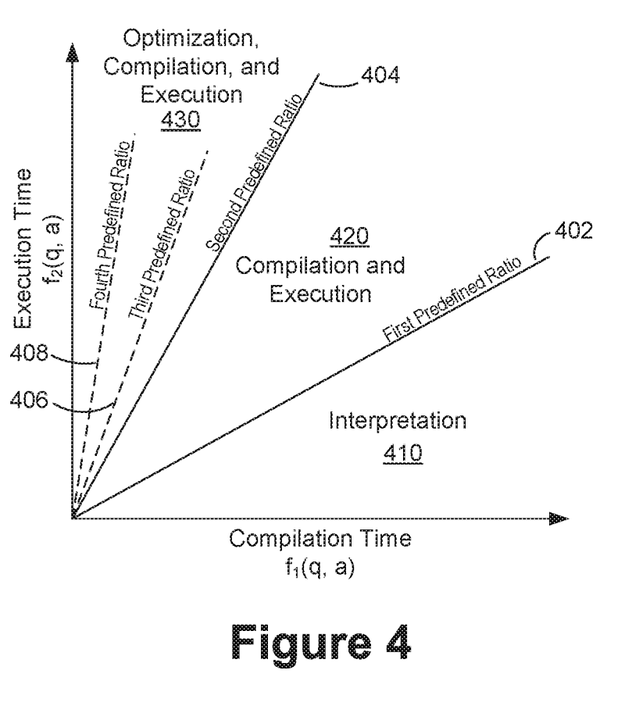
FIGS. 4-6 are three diagrams illustrating selection of a query execution plan from a plurality of query execution options in accordance with some implementations.
Figure 5:
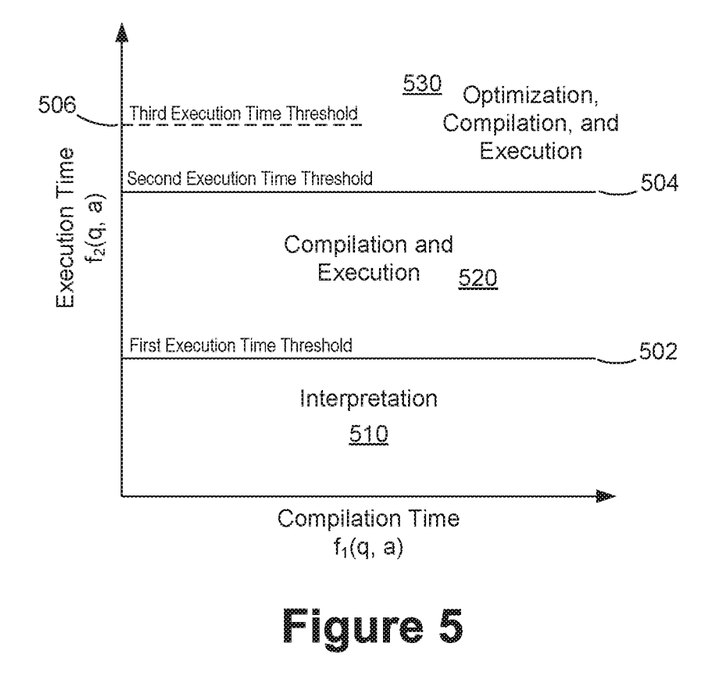
Figure 6:
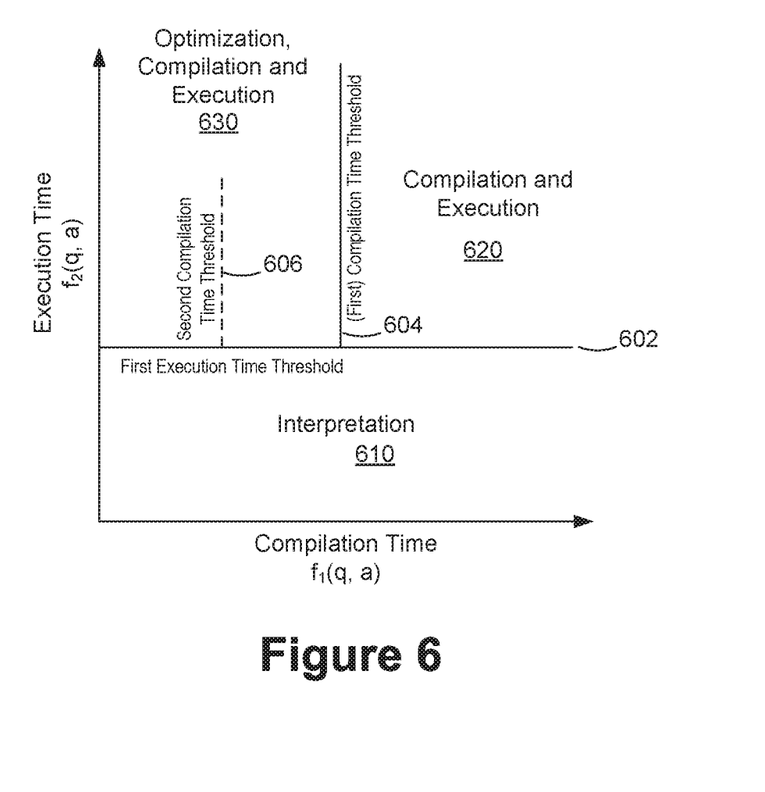

FIGS. 4-6 are three diagrams illustrating selection of a query execution plan from a plurality of query execution options 302 according to an estimated query compilation time and an estimated query execution time in accordance with some implementations. In some implementations, the interpretation criterion, the compilation criterion, and the optimized compilation criterion associated with three query execution options 302 partition a coordinate space of the estimated query execution time and the estimated compilation time into three disjoint regions (e.g., non-overlapping sectors).

Referring to FIG. 4, two or more predefined threshold ratios between the estimated query execution and compilation times are used to select the query execution plan from the plurality of query execution options. The first execution option specifies direct interpretation (410) of an intermediate representation when the ratio between the estimated query execution time and compilation time is less than or equal to the first predefined threshold ratio 402. The second execution option specifies compilation of the intermediate representation with no or little code optimization when the ratio between the estimated query execution time and compilation time is greater than the first predefined threshold ratio 402, but less than a second predefined threshold ratio 404. The third execution option specifies compilation of the intermediate representation with a certain level of code optimization when the ratio between the estimated query execution time and compilation time is greater than or equal to the second predefined threshold ratio 404.

In some implementations, the sector corresponding to the third execution option further includes two or more sub-sectors, each of which is associated with one of a plurality of levels of code optimization. In this example as shown in FIG. 4, three sub-sectors exist in association with the third execution option, which includes compilation of the intermediate representation using three distinct levels of code optimization. When the ratio between the estimated query execution time and compilation time is greater than the second predefined threshold ratio 404 but less than or equal to the third predefined threshold ratio 406, a first type of code optimization is applied by the optimizer 236 to generate optimized machine code. When the ratio between the estimated query execution time and compilation time is greater than the third predefined threshold ratio 406 but less than or equal to a fourth predefined threshold ratio 408, a second type of code optimization is applied by the optimizer 236 to generate optimized machine code. When the ratio between the estimated query execution time and compilation time is greater than the fourth predefined threshold ratio 408, a third type of code optimization is applied by the optimizer 236 to generate optimized machine code. The third type of code optimization generally requires a longer compilation time than the second type of code optimization, which generally requires a longer compilation time than the first type of code optimization. However, the third type of code optimization is designed to execute with overall processing speed better than the second type of code optimization, and the code generated by the second type of code optimization is designed to have overall processing speed better than the first type of code optimization.

In some implementations, each of the estimated query execution time and the estimated query compilation time is a function of one or more query characteristics, one or more database characteristics, or both. Specifically, in some implementations, the query compilation time is estimated using a function that is formed based on a subset of the one or more query characteristics, including the number of instructions, the types of the instructions, the number of functions, and the number of execution blocks in the intermediate representation. When the intermediate representation includes a plurality of execution blocks and the number of blocks is large (e.g., larger than a predefined number of blocks), the estimated query compilation time is approximately a super linear function of the number of blocks in the intermediate representation. In some implementations, the query execution time is estimated by a function that is formed based on a histogram of data that will be accessed to retrieve the result set, or simply based on an overall histogram of data in the database 122. The histogram of the data includes a data range and distribution of the data. In some implementations, the query execution time is estimated by sampling. For example, some implementations perform the query on a small sample of the data (e.g., 1% or 0.01% of the data rows). This can be used for estimating execution time for the entire set of relevant data.

In some implementations, the query compilation time is estimated by a linear function as follows:

$$f_1 = k_1 \cdot SC \qquad (1)$$

where SC represents the size of the intermediate representation (e.g., a number of instructions), and $k_1$ represents a compilation time coefficient. In some implementations, the query execution time may be estimated by a linear function as follows:

$$f_2 = k_2 \cdot SR \qquad (2)$$

where SR represents an estimated number of rows that will be accessed to retrieve the result set and $k_2$ represents an execution time coefficient.

Referring to FIG. 5, in some implementations, two or more predefined execution time thresholds are used to select the query execution plan from the plurality of query execution options. The first execution option specifies direct interpretation (510) of an intermediate representation when the estimated execution time is less than or equal to a first execution time threshold 502. The second execution option specifies compilation (520) of the intermediate representation with no or little code optimization when the estimated execution time is greater than the first execution time threshold 502 and less than a second execution time threshold 504. The third execution option specifies compilation of the intermediate representation with a certain level of code optimization (530) when the estimated execution time is greater than or equal to the second execution time threshold 504. Here, code optimization is conducted when the query execution time is estimated to be very long. Given that the query execution plan is selected from the plurality of query execution options independent of the estimated query compilation time, the execution selector 244 estimates the query execution time, and optionally does not estimate the query compilation time.

In some implementations, a region 530 corresponding to the third execution option further includes two or more sub-regions, each of which is associated with one of a plurality of levels of code optimization. In this example as shown in FIG. 5, two sub-regions exist in association with the third execution option. These sub-regions indicate compilation of the intermediate representation with two distinct levels of code optimization. When the estimated execution time is greater than or equal to the second execution time threshold 504 but less than a third execution time threshold 506, a first type of code optimization is applied by the optimizer 236 to generate optimized machine code. When the estimated execution time is greater than or equal to the third execution time threshold 506, a second type of code optimization is applied by the optimizer 236 to generate optimized machine code. The second type of code optimization may require a longer compilation time than the first type of code optimization, but provides optimized machine code having a higher level of optimization than code provided by the first type of code optimization.

Referring to FIG. 6, in some implementations, a predefined execution time threshold and one or more predefined compilation time thresholds are used to select the query execution plan from the plurality of query execution options. The first execution option specifies direct interpretation (610) of the intermediate representation when the estimated execution time is less than or equal to a first execution time threshold 602. The second execution option specifies compilation (620) of the intermediate representation with no or little code optimization when the estimated execution time is greater than the first execution time threshold 602 and the estimated compilation time is greater than or equal to a first compilation time threshold 604. The third execution option specifies compilation of the intermediate representation with a certain level of code optimization (630) when the estimated execution time is greater than the first execution time threshold 602 and the estimated compilation time is less than the first compilation time threshold 604. Stated another way, code optimization is conducted here when the query compilation time is estimated to be reasonably low.

In some implementations, the region 630 corresponding to the third execution option further includes two or more sub-regions, each of which is associated with one of a plurality of levels of code optimization. In this example as shown in FIG. 6, a first type of code optimization is applied by the optimizer 236 to generate optimized machine code when the estimated execution time is greater than the first execution time threshold 602 and the estimated compilation time is greater than or equal to a second compilation time threshold 606 but less than the first compilation time threshold 604. The second type of code optimization is applied by the optimizer 236 to generate optimized machine code when the estimated execution time is greater than the first execution time threshold 602 and the estimated compilation time is less than the second compilation time threshold 606. The second type of code optimization requires a longer compilation time than the first type of code optimization, but provides optimized machine code having a higher level of optimization than code provided by the first type of code optimization.

In some implementations, the estimated query execution time is associated with one or more database characteristics (e.g., an estimated number of rows that will be accessed to retrieve the result set), and the estimated query execution time is associated with one or more query characteristics (e.g., a number of instruction in the intermediate representation translated from the database query). In some implementations, the execution selector 244 does not need to estimate the query execution time or the query compilation time precisely. Rather, the execution selector 244 estimates the number of rows that will be accessed to retrieve the result set, and the number of instructions in the intermediate representation. The execution selector 244 determines whether the estimated query execution time and estimated compilation time satisfy any of the interpretation criterion, the compilation criterion, or the optimized compilation criterion by comparing the number of rows with a database row threshold (e.g., 100000 rows) and comparing the number of instruction of the intermediate representation with an instruction number threshold (e.g., 725 instructions). In some implementations, an intermediate representation having 725 instructions is estimated to have a compilation time of 50 milliseconds for a certain type of workstation. Here, optimized compilation can become very expensive for large size LLVM code, and therefore, compilation with no or little optimization is applied for programs having more instructions than the instruction threshold.

Compilation time and execution time are independent variables, so they can be used to form a two-dimensional coordinate system, as illustrated in FIGS. 4-6. Because compile time and execution time are always positive, only the first quadrant of the coordinate system is relevant. FIGS. 4-6 illustrate various ways to partition the first quadrant into different regions for which different execution options are used. In general, each execution option is either interpreted or compiled, and may have zero or more types of optimization applied. Although not depicted in FIGS. 4-6, some implementations include two or more interpreted options, with different levels of optimization. Some implementations subdivide the first quadrant in various ways based on empirical data (e.g., using the feedback 310 illustrated in FIG. 3). The regions typically have linear boundaries. In some implementations, one or more of the regions is bounded, whereas other regions are unbounded.

Figure 7A:
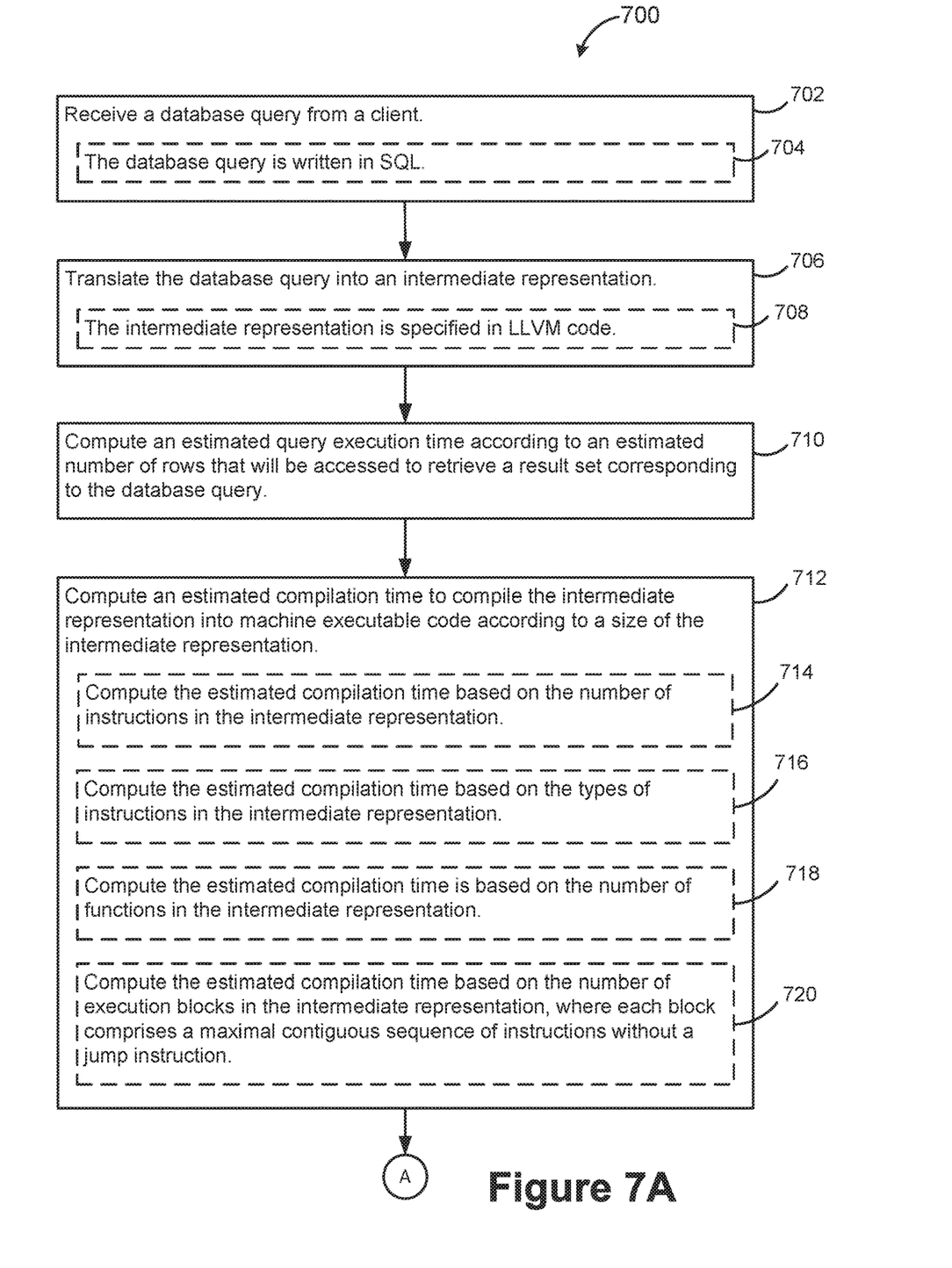
FIGS. 7A and 7B provide a flowchart of a method for retrieving data from a database in accordance with some implementations.
Figure 7B:
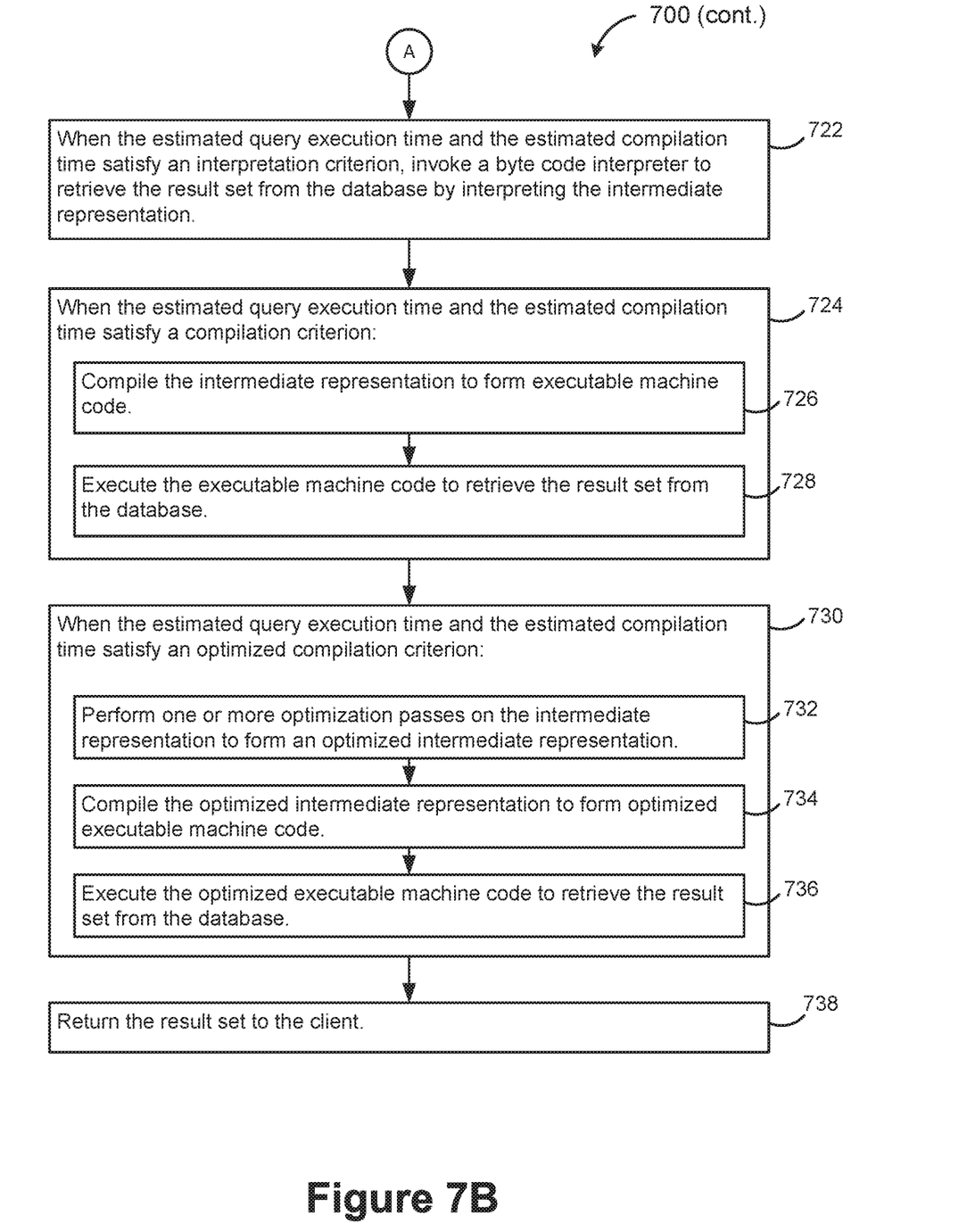

FIGS. 7A and 7B provide a flowchart of a method 700 for retrieving data from a database in accordance with some implementations. In some implementations, the method 700 is performed by instructions that are stored on a non-transitory computer readable storage medium and are executed by one or more processors of a computer system 200. Each of the operations shown in FIGS. 7A and 7B may correspond to instructions stored in computer memory or on a non-transitory computer readable storage medium (e.g., the memory 214 of the computer system 200). The computer readable storage medium may include a magnetic or optical disk storage device, solid state storage devices such as flash memory, or other non-volatile memory device or devices. The instructions stored on the computer readable storage medium may include one or more of: source code, assembly language code, object code, or other instruction format that is interpreted by one or more processors. Some operations in the method 700 may be combined and/or the order of some operations may be changed.

In accordance with the method 700 for retrieving data from the database, the computer system receives (702) a database query from a client. In some implementations, the database query is written (704) in SQL. The computer system translates (706) the database query into intermediate representation. In some implementations, the intermediate representation is specified (708) in LLVM code.

Generally, translating the database query into an intermediate representation involves several steps, which include: parsing the query to form an operator tree, logically optimizing the operator tree, and compiling the operator tree to form the intermediate representation. The intermediate representation is generally not machine executable code.

The computer system 200 (or the execution selector 244 of the computer system 200) then computes (710) an estimated query execution time according to an estimated number of rows that will be accessed to retrieve a result set corresponding to the database query, and computes (712) an estimated compilation time to compile the intermediate representation into machine executable code according to the size of the intermediate representation. In some implementations, computing the estimated compilation time is based (714) on the number of instructions in the intermediate representation. In some implementations, computing the estimated compilation time is based (716) on the types of instructions in the intermediate representation. In some implementations, computing the estimated compilation time is based (718) on the number of functions in the intermediate representation. In some implementations, computing the estimated compilation time is based (720) on the number of execution blocks in the intermediate representation. Each execution block comprises a maximal contiguous sequence of instructions without a jump instruction.

In accordance with a determination that the estimated query execution time and the estimated compilation time satisfy an interpretation criterion, the computer system 200 invokes (722) a byte code interpreter 228 to retrieve the result set from the database by interpreting the intermediate representation. In accordance with a determination (724) that the estimated query execution time and the estimated compilation time satisfy a compilation criterion, the computer system compiles (726) the intermediate representation to form executable machine code, and executes (728) the executable machine code to retrieve the result set from the database. In accordance with a determination (730) that the estimated query execution time and the estimated compilation time satisfy an optimized compilation criterion, the computer system 200 performs (732) one or more optimization passes on the intermediate representation to form an optimized intermediate representation, compiles (734) the optimized intermediate representation to form optimized executable machine code, and executes (736) the optimized executable machine code to retrieve the result set from the database. Regardless of the execution option selected, the result set is returned (738) to the client.

In some implementations, the interpretation criterion, the compilation criterion, and the optimized compilation criterion are constructed based on one or more test databases and a plurality of test database queries prior to receiving the database query. In some implementations, the interpretation criterion, the compilation criterion, and the optimized compilation criterion are mutually exclusive. In some implementations, when the interpretation criterion is satisfied, the compilation criterion and the optimized compilation criterion are not evaluated. In some implementations, the interpretation criterion, the compilation criterion, and the optimized compilation criterion partition the set of all pairs (e, c) of estimated query execution time and estimated compilation time into three disjoint regions, as illustrated in FIGS. 4-6.

In some implementations, the method for retrieving data from the database further includes computing a ratio of the estimated execution time and the estimated query compilation time. The interpretation criterion is satisfied when the ratio is less than a first threshold 402. The compilation criterion is satisfied when the ratio is greater than a first threshold 402 but less than a second threshold 404. The optimized compilation criterion is satisfied when the ratio is greater than the second threshold 404. More details on retrieving data based on the ratio of the estimated execution time and the compilation time are discussed above with reference to FIG. 4.

In some implementations, the interpretation criterion is satisfied when the estimated number of rows that will be accessed to retrieve the result set is less than or equal to a first threshold 502. In some implementations, the compilation criterion is satisfied when the estimated number of rows that will be accessed to retrieve the result set is greater than the first threshold 502 but less than a second threshold 504. In some implementations, the optimized compilation criterion is satisfied when the estimated number of rows that will be accessed to retrieve the result set is greater than the second threshold 504. More details on using the estimated number of rows to determine an execution plan is explained above with reference to FIG. 5.

It should be understood that the particular order in which the operations in FIGS. 7A and 7B have been described is merely exemplary and are not intended to indicate that the described order is the only order in which the operations could be performed. One of ordinary skill in the art would recognize various ways to cache and distribute specific data as described herein. Additionally, it should be noted that details of other processes described with respect FIGS. 2-6 are also applicable in an analogous manner to the method 700 described above with respect to FIGS. 7A and 7B. For brevity, these details are not repeated here.

Some implementations refer to using a byte code interpreter as running a virtual machine.

Some implementations use a hybrid approach to selection of the query execution option. For example, when the interpretation criterion is satisfied, some implementations immediately start execution using the byte-code interpreter (the virtual machine approach), but also initiate compilation (or optimized compilation) in the background. If the byte-code interpreter finishes first, the query results are just sent to the client. However, if the compilation finishes first and there are more search results to retrieve, the process switches from the interpreted mode to the compiled mode at the next execution checkpoint (e.g., the next morsel of data). This dual approach can be particularly useful on a system with many CPUs/cores where the background compilation does not slow down the execution of the interpreter.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for retrieving data from a database, comprising:
   at a computer system having one or more processors and memory storing one or more programs configured for execution by the one or more processors:
   receiving a database query from a client;
   translating the database query into an intermediate representation;
   computing an estimated query execution time according to an estimated number of rows that will be accessed to retrieve a result set corresponding to the database query;
   computing an estimated compilation time to compile the intermediate representation into machine executable code according to a size of the intermediate representation;
   in accordance with a determination that the estimated query execution time and the estimated compilation time satisfy an interpretation criterion, invoking a byte code interpreter to retrieve the result set from the database by interpreting the intermediate representation;
   in accordance with a determination that the estimated query execution time and the estimated compilation time satisfy a compilation criterion:
      compiling the intermediate representation to form executable machine code; and
      executing the executable machine code to retrieve the result set from the database;
   in accordance with a determination that the estimated query execution time and the estimated compilation time satisfy an optimized compilation criterion:
      performing one or more optimization passes on the intermediate representation to form an optimized intermediate representation;
      compiling the optimized intermediate representation to form optimized executable machine code; and
      executing the optimized executable machine code to retrieve the result set from the database; and
   returning the result set to the client.

2. The method of claim 1, wherein the intermediate representation is specified in low level virtual machine (LLVM) code.

3. The method of claim 1, wherein computing the estimated compilation time is based on a number of instructions in the intermediate representation.

4. The method of claim 1, wherein computing the estimated compilation time is based on types of instructions in the intermediate representation.

5. The method of claim 1, wherein computing the estimated compilation time is based on a number of functions in the intermediate representation.

6. The method of claim 1, wherein computing the estimated compilation time is based on a number of execution blocks in the intermediate representation, wherein each block comprises a maximal contiguous sequence of instructions without a jump instruction.

7. The method of claim 1, wherein the interpretation criterion, the compilation criterion, and the optimized compilation criterion are determined using one or more test databases and a plurality of test database queries prior to receiving the database query.

8. The method of claim 1, wherein the interpretation criterion is satisfied when the estimated number of rows that will be accessed to retrieve the result set is less than or equal to a first threshold.

9. The method of claim 8, wherein the compilation criterion is satisfied when the estimated number of rows that will be accessed to retrieve the result set is greater than the first threshold but less than a second threshold.

10. The method of claim 9, wherein the optimized compilation criterion is satisfied when the estimated number of rows that will be accessed to retrieve the result set is greater than the second threshold.

11. The method of claim 1, wherein the interpretation criterion, the compilation criterion, and the optimized compilation criterion are mutually exclusive.

12. The method of claim 1, wherein, when the interpretation criterion is satisfied, the compilation criterion and the optimized compilation criterion are not evaluated.

13. The method of claim 1, further comprising computing a ratio of the estimated execution time and the estimated query compilation time, wherein:
   the interpretation criterion comprises a rule that the ratio is less than a first threshold;

the compilation criterion comprises a rule that the ratio is greater than a first threshold but less than a second threshold; and the optimized compilation criterion comprises a rule that the ratio is greater than the second threshold.

14. The method of claim 1, wherein the interpretation criterion, the compilation criterion, and the optimized compilation criterion partition a set of all pairs (e, c) of estimated query execution time and estimated compilation time into three disjoint regions.

15. The method of claim 1, wherein the database query is written in SQL.

16. A computer system having one or more computing devices, each computing device having one or more processors and memory, wherein the memory stores one or more programs configured for execution by the one or more processors, the one or more programs comprising instructions for:

receiving a database query from a client;
translating the database query into an intermediate representation;
computing an estimated query execution time according to an estimated number of rows that will be accessed to retrieve a result set corresponding to the database query;
computing an estimated compilation time to compile the intermediate representation into machine executable code according to a size of the intermediate representation;
in accordance with a determination that the estimated query execution time and the estimated compilation time satisfy an interpretation criterion, invoking a byte code interpreter to retrieve the result set from the database by interpreting the intermediate representation;
in accordance with a determination that the estimated query execution time and the estimated compilation time satisfy a compilation criterion:
   compiling the intermediate representation to form executable machine code; and
   executing the executable machine code to retrieve the result set from the database;
in accordance with a determination that the estimated query execution time and the estimated compilation time satisfy an optimized compilation criterion:
   performing one or more optimization passes on the intermediate representation to form an optimized intermediate representation;
   compiling the optimized intermediate representation to form optimized executable machine code; and
   executing the optimized executable machine code to retrieve the result set from the database; and
returning the result set to the client.

17. The computer system of claim 16, wherein computing the estimated compilation time is based on a number of execution blocks in the intermediate representation, wherein each block comprises a maximal contiguous sequence of instructions without a jump instruction.

18. The computer system of claim 16, wherein:
the interpretation criterion is satisfied when the estimated number of rows that will be accessed to retrieve the result set is less than or equal to a first threshold;
the compilation criterion is satisfied when the estimated number of rows that will be accessed to retrieve the result set is greater than the first threshold but less than a second threshold; and
the optimized compilation criterion is satisfied when the estimated number of rows that will be accessed to retrieve the result set is greater than the second threshold.

19. The computer system of claim 16, further comprising computing a ratio of the estimated execution time and the estimated query compilation time, wherein:
the interpretation criterion comprises a rule that the ratio is less than a first threshold;
the compilation criterion comprises a rule that the ratio is greater than a first threshold but less than a second threshold; and
the optimized compilation criterion comprises a rule that the ratio is greater than the second threshold.

20. A non-transitory computer readable storage medium storing one or more programs configured for execution by a computer system having one or more processors and memory, the one or more programs comprising instructions for:

receiving a database query from a client;
translating the database query into an intermediate representation;
computing an estimated query execution time according to an estimated number of rows that will be accessed to retrieve a result set corresponding to the database query;
computing an estimated compilation time to compile the intermediate representation into machine executable code according to a size of the intermediate representation;
in accordance with a determination that the estimated query execution time and the estimated compilation time satisfy an interpretation criterion, invoking a byte code interpreter to retrieve the result set from the database by interpreting the intermediate representation;
in accordance with a determination that the estimated query execution time and the estimated compilation time satisfy a compilation criterion:
   compiling the intermediate representation to form executable machine code; and
   executing the executable machine code to retrieve the result set from the database;
in accordance with a determination that the estimated query execution time and the estimated compilation time satisfy an optimized compilation criterion:
   performing one or more optimization passes on the intermediate representation to form an optimized intermediate representation;
   compiling the optimized intermediate representation to form optimized executable machine code; and
   executing the optimized executable machine code to retrieve the result set from the database; and
returning the result set to the client.

* * * * *